(12) United States Patent
Boonekamp et al.

(10) Patent No.: US 11,965,625 B2
(45) Date of Patent: Apr. 23, 2024

(54) LIGHT EMITTING DEVICE

(71) Applicant: SIGNIFY HOLDING B.V., Eindhoven (NL)

(72) Inventors: Erik Paul Boonekamp, Bunnik (NL); Ludovicus Johannes Lambertus Haenen, Sint Oedenrode (NL); Joris Jan Vrehen, Waalre (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/616,174

(22) PCT Filed: May 27, 2020

(86) PCT No.: PCT/EP2020/064640
§ 371 (c)(1),
(2) Date: Dec. 2, 2021

(87) PCT Pub. No.: WO2020/244979
PCT Pub. Date: Dec. 10, 2020

(65) Prior Publication Data
US 2022/0243875 A1 Aug. 4, 2022

(30) Foreign Application Priority Data

Jun. 3, 2019 (EP) .................................. 19177795

(51) Int. Cl.
*F21K 9/62* (2016.01)
*F21V 5/04* (2006.01)
*F21Y 115/10* (2016.01)

(52) U.S. Cl.
CPC ............... *F21K 9/62* (2016.08); *F21V 5/041* (2013.01); *F21Y 2115/10* (2016.08)

(58) Field of Classification Search
CPC ... F21K 9/62; F21K 9/61; F21V 5/041; F21Y 115/10
See application file for complete search history.

(56) References Cited

U.S. PATENT DOCUMENTS

| 4,727,457 A | 2/1988 | Thillays |
| 5,997,155 A | 12/1999 | Ducharme et al. |

(Continued)

FOREIGN PATENT DOCUMENTS

| CN | 201688199 U | 12/2010 |
| CN | 103343907 A | 10/2013 |

(Continued)

*Primary Examiner* — William J Carter

(57) ABSTRACT

A light emitting device (1) adapted for projecting a light beam (15) onto a target surface, the light emitting device (1) comprising a light engine (2) comprising a light source (3), a light mixing chamber (4), and an optical component (5) having a spherical shape with a curved light-receiving surface (51), where the light source (3) is arranged to, in operation, emit light towards a light exit window (41) of the at least one light mixing 5 chamber, the light exit window (41) of the at least one light mixing chamber (4) thereby acting as an extended light source with a curved light-emitting surface, where the optical component (5) is provided adjacent to the light exit window (41) of the light mixing chamber, and where the curved light emitting surface of the at least one light mixing chamber (4) is conformal to an the curved light-receiving surface (51) of the optical component (5) and 10 coincident with a focal surface (52) of the optical component (5).

14 Claims, 19 Drawing Sheets

(56) References Cited

U.S. PATENT DOCUMENTS

| | | | |
|---|---|---|---|
| 8,616,734 B2* | 12/2013 | Olsson | H01L 33/58 362/311.06 |
| 9,732,941 B2 | 8/2017 | Maier | |
| 2003/0095409 A1 | 5/2003 | Cheng | |
| 2006/0250814 A1 | 11/2006 | Tabor | |
| 2011/0182065 A1* | 7/2011 | Negley | F21V 7/0091 362/382 |
| 2013/0051061 A1 | 2/2013 | Yoo | |
| 2013/0057140 A1 | 3/2013 | Falicoff et al. | |
| 2015/0146132 A1* | 5/2015 | Katsuta | F21V 5/04 362/311.07 |

FOREIGN PATENT DOCUMENTS

| | | |
|---|---|---|
| CN | 106051508 A | 10/2016 |
| CN | 108006453 A | 5/2018 |
| CN | 208282007 U | 12/2018 |
| JP | 2009110787 A | 5/2009 |
| JP | 2011127841 A | 6/2011 |
| WO | 2011014986 A1 | 2/2011 |
| WO | 2011149133 A1 | 12/2011 |
| WO | 2016113234 A1 | 7/2016 |

\* cited by examiner $I(\theta,\phi)$ $I(\theta,\phi)$

LIGHT EMITTING DEVICE

CROSS-REFERENCE TO PRIOR APPLICATIONS

This application is the U.S. National Phase application under 35 U.S.C. § 371 of International Application No. PCT/EP2020/064640, filed on May 27, 2020, which claims the benefit of European Patent Application No. 19177795.2, filed on Jun. 3, 2019. These applications are hereby incorporated by reference herein.

FIELD OF THE INVENTION

The invention relates to a light emitting device adapted for projecting a beam onto a target surface, the light emitting device comprising at least one light engine comprising at least one light source adapted for, in operation, emitting light, at least one light mixing chamber and an optical component.

As used herein, a light mixing chamber is intended to mean a chamber, cavity, tube, box or the like which is adapted to or capable of mixing light originating from one or more light sources and travelling through it to form an output being a mixture of the light from the one or more light sources.

BACKGROUND OF THE INVENTION

There is a rapidly increasing interest in dynamic LED lighting systems in which the beam changes its shape depending on the needs of the user. The beam can be controlled by a smartphone or a remote control. Current examples of beam control use a liquid crystal (LC) element to control the shape of a collimated LED beam. Other examples have a small built-in motor to control the movement of optical components within a luminaire. Dynamic beams are also possible by using pixelated LED sources. These configurations work very well, but require multiple optical components (such as collector lenses, multiple plano-convex lenses and diffuser films) to shape the final beam. For instance, prior art document U.S. Pat. No. 4,727,457 disclose a device having a ball lens and an LED. The LED may be located in the focus of the ball lens, or within the focal distance. However, this device is an omnidirectional light source for decorative illumination, and not capable of projecting a well-defined image.

Also, all of the known concepts for remote adjustment of a light beam are either expensive or require a lot of effort to construct and maintain over a considerable lifetime (say more than 50.000 hours).

Therefore, there is a desire to provide a light emitting device of the type mentioned by way of introduction which has a simpler construction, which is cheap, which is easy to construct, and which requires little or no maintenance over its life time.

SUMMARY OF THE INVENTION

It is an object of the present invention to overcome this problem, and to provide a light emitting device adapted for projecting a beam onto a target surface, which light emitting device has a simpler construction, which is cheap, which is easy to construct, and which requires little or no maintenance over its life time.

According to a first aspect of the invention, this and other objects are achieved by means of a light emitting device adapted for projecting a beam onto a target surface, the light emitting device comprising a light engine comprising a light source, a light mixing chamber, and an optical component having a spherical shape with a curved light-receiving surface, the light source being arranged to, in operation, emit light towards a light exit window of the light mixing chamber, the light exit window of the light mixing chamber thereby acting as an extended light source with a curved light-emitting surface, the optical component being provided adjacent to the light exit window of the light mixing chamber, and the curved light-emitting surface of the light mixing chamber being conformal to the curved light-receiving surface of the optical component and coincident with a focal surface of the optical component.

Thereby, a light emitting device is provided which makes it possible to provide an adjustable beam using a single optical component, namely the spherically shaped optical component, combined with a shaped, extended light source due to the provision of the at least one light mixing chamber. Such a light emitting device has a very simple construction, which necessitates few components and which is cheap to manufacture.

In particular, by providing that the curved light-receiving surface of the light mixing chamber is conformal to the curved light-receiving surface of the optical component, and further is coincident with a focal surface of the optical component, a light emitting device is provided which is particularly simple to construct and assemble, and which requires little or no maintenance over its life time. Such a light emitting device is capable of projecting a very well-defined image.

Furthermore, as will be clear from the below, because the extended light source can be divided in pixels or domains, pattern-wise (dynamic) lighting becomes possible. This approach has an enormous potential for retail/shop illumination, architectural lighting and outdoor lighting.

In an embodiment, the optical component is a spherical lens, a ball lens or a dielectric sphere.

Such an optical component is very useful for illumination purposes and provides for not only a particularly simple construction of the light emitting device, but also a particularly well-defined projected image.

In an embodiment, the light source comprises any one of at least one LED, an array of LEDs, an array of mini-LEDs and an array of micro-LEDs.

Such a light emitting device is particularly simple in construction. Furthermore, providing an array of LEDs, mini-LEDs or micro-LEDs provide for an especially uniform light output of the extended light source, and thus of the light beam exiting the light mixing chamber.

In an embodiment, each LED of the array of LEDs, mini-LEDs and/or micro-LEDs is individually controllable.

In addition to the above, this provides for enabling fine tuning of the light output of the extended light source, and thus of the light beam exiting the light mixing chamber.

In an embodiment, the light emitting device comprises two or more light engines.

Thereby a light emitting device is provided which has a greater versatility in terms of the variation in light outputs obtainable, and which may thus fulfill a greater range of user demands.

In an embodiment, the light exit window of the light mixing chamber is rectangular.

Thereby a light emitting device is provided which allows for providing more complex and customizable illumination patterns, especially if combined with employing more than one light source.

In an embodiment, the light mixing chamber comprises reflective walls.

Thereby a light emitting device is provided which loss of light in the light mixing chamber is minimized or avoided altogether, and with which the light output of the light mixing chamber is particularly uniform.

In an embodiment, a diffuser is provided at the light exit window of the light mixing chamber.

Thereby a light emitting device is provided with which the light delivered to the optical component is particularly uniform and is furthermore free from artefacts.

In an embodiment, the shape of the diffuser is conformal to the shape of the optical component.

Thereby, a light emitting device is provided which is particularly simple to construct, and which requires little or no maintenance over its life time. Such a light emitting device is furthermore capable of projecting a particularly well-defined image.

In an embodiment, the light mixing chamber is divided into at least two compartments.

Thereby a light emitting device is provided which has a greater versatility in terms of the possible illumination patterns obtainable, and which may thus fulfill a greater range of user demands.

In an embodiment, the at least two compartments of the light mixing chamber are separated by means of a diffusive or specular reflective wall.

Thereby, a light emitting device is provided which enables individual control of the light output of each compartment of the light mixing chamber, and which thus has a great versatility in terms of the variation in light outputs obtainable. Furthermore, by providing the separating wall as a reflective or specular wall, a light emitting device is provided which loss of light at the separating wall is minimized or avoided altogether, and with which the light output of the light mixing chamber is thus particularly uniform.

In an embodiment, the light mixing chamber comprises any one of mixing rods, tapered mixing rods, light guides, tapered light guides, a tapered hexagonal collimator and an array of square mixing rods.

Thereby a light emitting device is provided which has a particularly great versatility in terms of the possible illumination patterns obtainable, as in principle any illumination pattern may be obtained depending on the particular construction and distribution of the parts of the light mixing chamber.

Furthermore, by also collimating the light output of the light mixing chamber, the optical efficiency of the light emitting device is improved.

In an embodiment, the optical component is or comprises an array of lenses.

This embodiment is especially advantageous for spot modules, and provides for a further improved versatility in terms of the illumination patterns made possible.

In an embodiment, each lens of the array of lenses is associated with a light source.

Thereby a light emitting device is provided which has a reduced thickness, and which has a superior thermal performance.

The invention furthermore, in a second aspect, concerns a lamp, a luminaire, or a lighting fixture comprising a light emitting device according to the invention.

Such a lamp, a luminaire or a lighting fixture may be a lamp, a luminaire or a lighting fixture, for instance a spot module, for retail or shop illumination, for architectural lighting or for outdoor lighting purposes.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

FIG. 7A illustrates the result of both light sources being on, FIG. 7B illustrates the result of the light source with the higher color temperature being on and FIG. 7C illustrates the result of the light source with the lower color temperature being on.

FIG. 9A illustrates the result of the light sources arranged in both compartments being on, while FIG. 9B illustrates the result of the light sources arranged in one compartment being on and the light sources arranged in the other compartment being off.

Like reference numerals refer to like elements throughout.

Figure 3A:
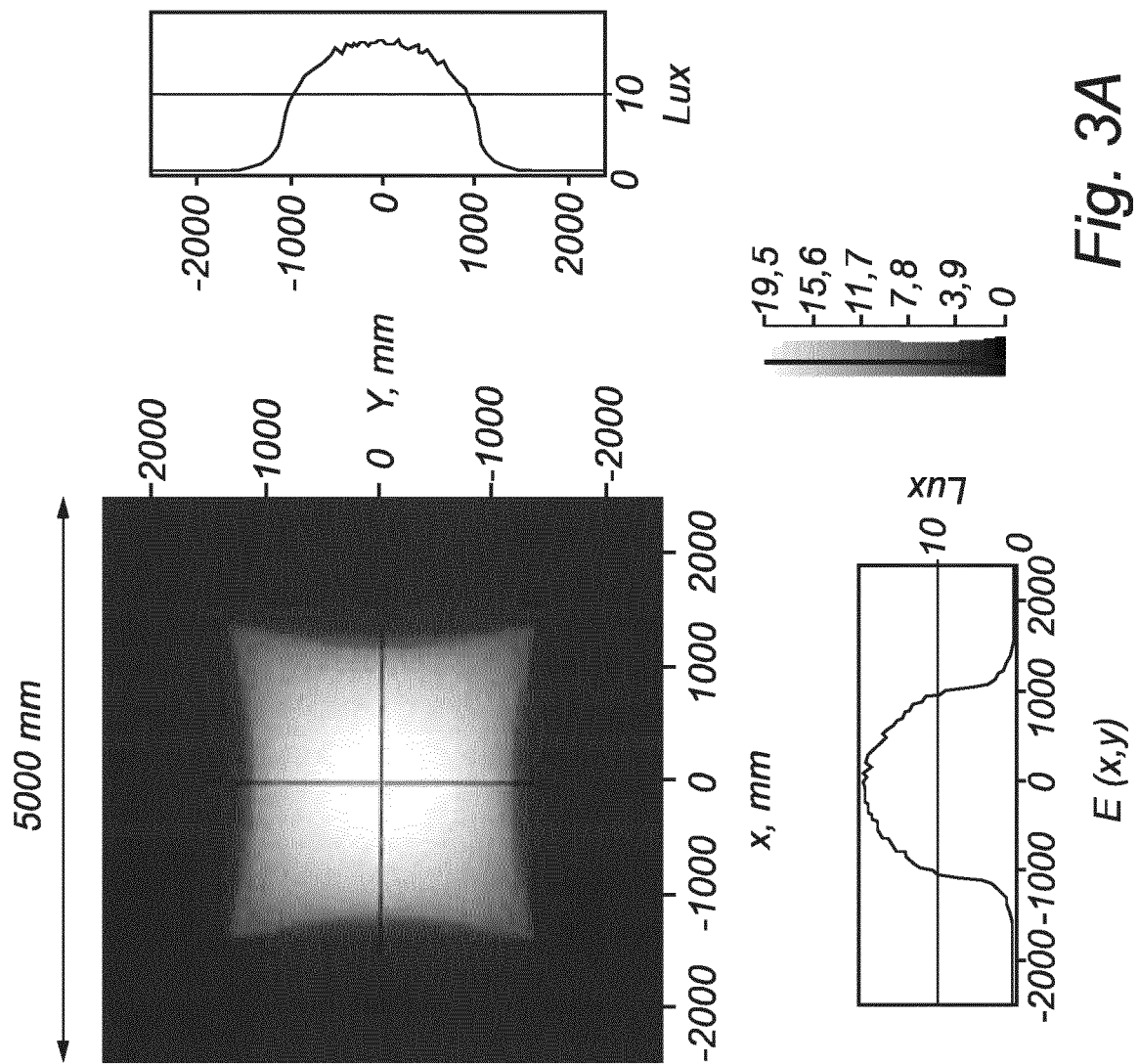
FIG. 3A illustrates a light pattern.
Figure 3B:
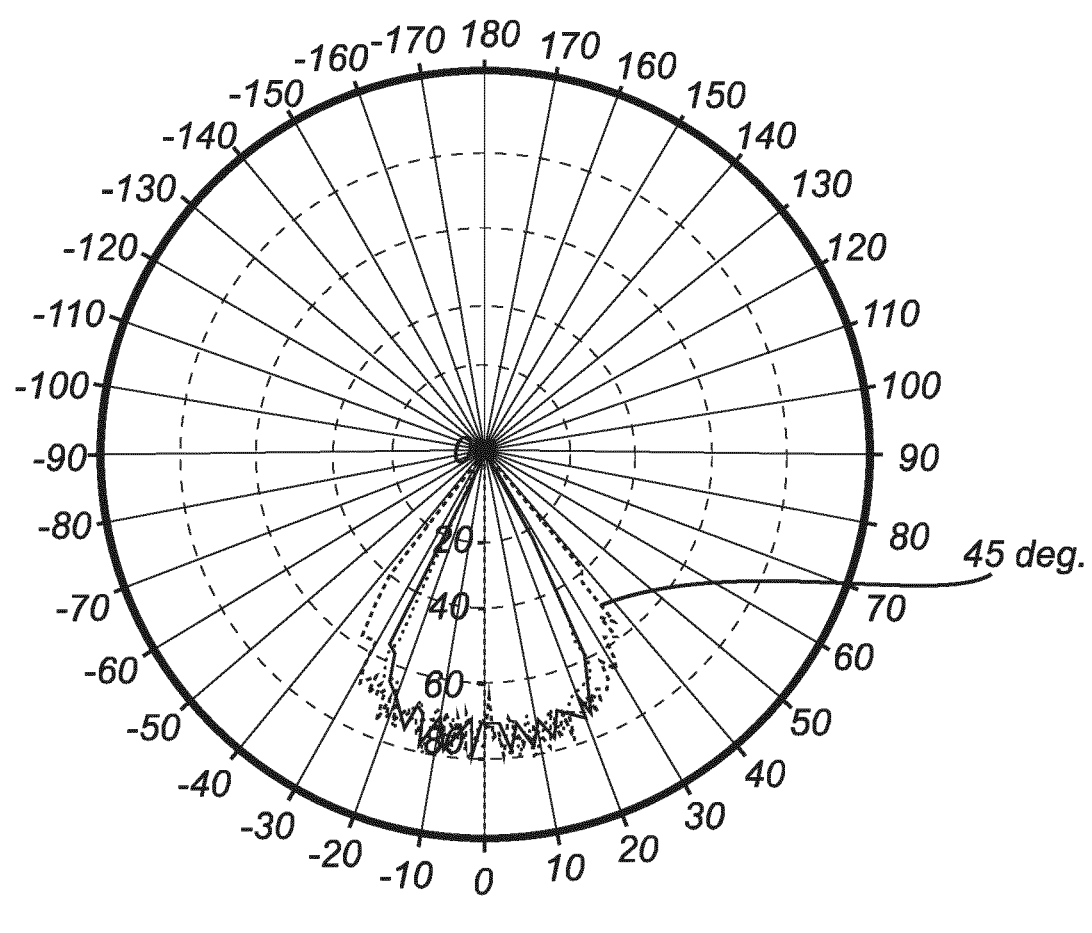
FIG. 3B illustrates an intensity distribution, obtained with a light emitting device according to FIG. 2A.

It is noted that throughout the drawing, cf. for instance FIG. 3A, E (x, y) denotes the illuminance on the plane of projection (for instance a floor or a wall) and, cf. for instance in FIG. 3B, I(θ, φ) denotes the far-field intensity profile obtained with the light emitting device.

DETAILED DESCRIPTION OF THE EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
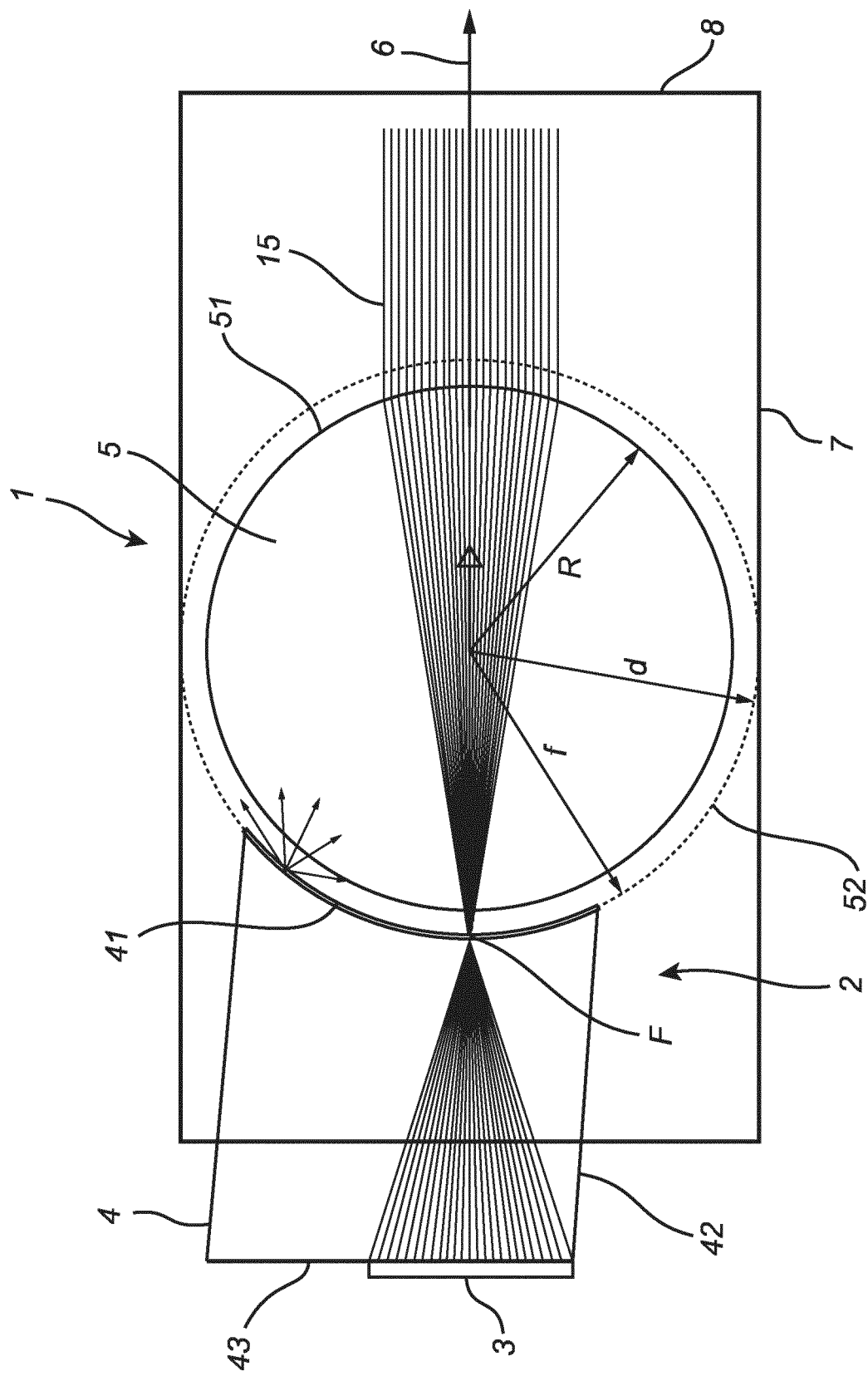
FIG. 1 shows a schematic cross-sectional side view of a first embodiment of a light emitting device according to the invention.

FIG. 1 shows a cross-sectional side view of a light emitting device 1 according to a first embodiment of the invention.

Generally, and irrespective of the embodiment, the light emitting device 1 is of the type adapted for projecting a light beam 15 onto a target surface. The light emitting device 1 comprises at least one light engine 2. The light engine 2 comprises one or more light sources 3, at least one light mixing chamber 4 and an optical component 5. The optical component 5 has a spherical shape.

Generally, and irrespective of the embodiment, when seen along the optical axis 6 of the light emitting device 1, the at least one light mixing chamber 4 is arranged between the at least one light source 3 and the spherical optical component 5.

The light emitting device may furthermore comprise a housing 7 with a front window 8. The housing 7 may be a black absorbing housing or tube. The front window 8 is transparent and may for example be made of clear polycarbonate or textured PMMA, optionally provided with a diffusing component such as a diffuser film.

Generally, and irrespective of the embodiment, the at least one light source 3 comprises one or more LEDs. The LEDs may be adapted to emit light of any feasible color. In embodiments comprising two or more LEDs, the LEDs may be adapted to emit light of the same color temperature or of two or more different color temperatures. The at least one LED may also be a tunable LED.

Generally, and irrespective of the embodiment, the at least one light mixing chamber comprises a light exit surface or window 41, a bottom surface 43 and a circumferential surface 42 extending between the light exit window 41 and the bottom surface 43. The bottom surface 43 and the circumferential surface 42 are non-light emitting surfaces.

The light emitting device 1 of FIG. 1 comprises one light mixing chamber 4 and one light source 3. The at least one light source 3 is arranged on the bottom surface 43 of the light mixing chamber.

Generally, and irrespective of the embodiment, the at least one light source 3 is arranged to, in operation, emit light in a direction generally towards the light exit window 41 of the light mixing chamber 4 such that the light exit window 41 of the light mixing chamber 4 thereby acts as an extended light source.

Generally, and irrespective of the embodiment, the optical component 5 is arranged adjacent to the light exit window 41 of the light mixing chamber 4. The light exit window 41 of the light mixing chamber comprises a curved surface configured to being conformal to the curvature of the outer surface 51 of the optical component 5. Cf also FIGS. 2C and 4C showing better the curvature of the light exit window 41. Furthermore, the light exit window 41 is positioned such as to be coincident with the focal surface 52 of the optical component 5.

The optical component 5 may, as illustrated schematically in FIG. 1, be a dielectric sphere, a spherical lens or a ball lens. Such optical components are characterized by having a radius, R, and a refractive index, n. The optical component 5 further comprises a diameter d. FIG. 1 shows the focal point, F, of a parallel incoming beam. The focal point, F, is located on the focal plane 52. The focal plane 52 is a spherical plane. Thus the focal length, f, fulfills the relation:

$$f = R \cdot n / (2(n-1)) \quad \{1\}$$

The focal plane (or focal surface) of a spherical lens is generally located close to the spherical lens surface. If, for instance, the refractive index, n, is 2, the focal plane is located exactly on the surface of the ball lens. Such lenses are often used for fiber-fiber coupling.

Spherical lenses and ball lenses are very useful for illumination applications. Because the focal plane is quite close to the spherical lens surface, it is possible to project an image of an extended source on the floor or wall in an efficient way. A prerequisite is that the surface of the extended light source, and thus in the present invention of the light exit window 41 of the light mixing chamber 4, follows the shape of the focal plane 52.

Figure 2A:
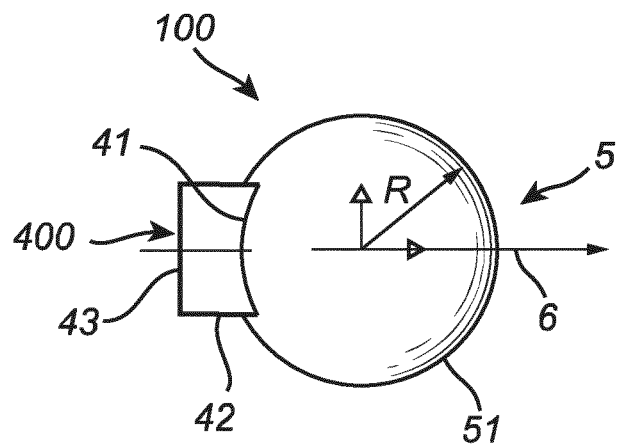
FIG. 2A shows a cross-sectional side view of a second embodiment of a light emitting device according to the invention.
Figure 2B:
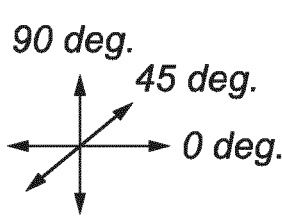
FIG. 2B shows a bottom view of the light emitting device according to FIG. 2A.
Figure 2B:
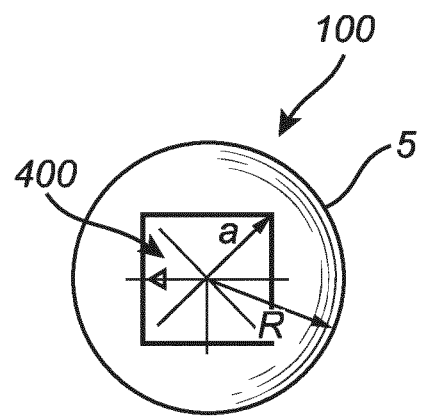
Figure 2C:
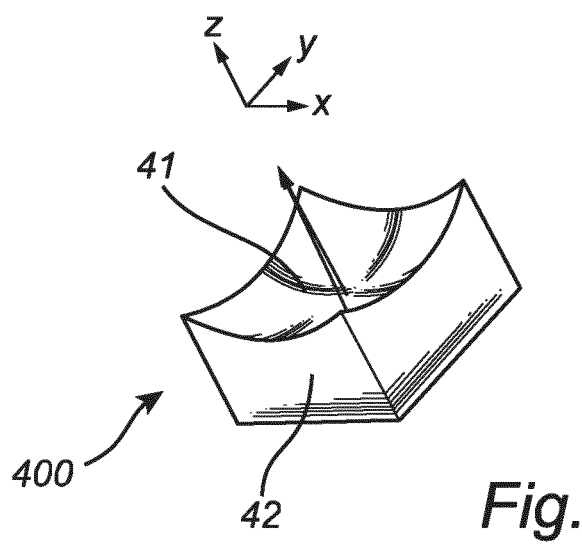
FIG. 2C shows a perspective view of a light mixing chamber of the light emitting device according to FIG. 2A.

FIG. 2A shows cross-sectional side view of a light emitting device 100 according to a second embodiment of the invention. FIG. 2B shows a bottom view of the light emitting device 100 according to FIG. 2A, and FIG. 2C shows a perspective view of a light mixing chamber of the light emitting device 100 according to FIG. 2A. The light emitting device 100 differs from that of FIG. 1 described above in that the light mixing chamber 400 of the light emitting device 100 is provided with a square cross-sectional shape.

The reason for providing the light mixing chamber 400 of the light emitting device 100 with a square cross-sectional shape is to provide a square illuminated pattern. However, and as is illustrated on FIG. 3A, such a light mixing chamber 400 in fact provides a square light pattern with concave sides. FIG. 3B illustrates the intensity distribution of the pattern of FIG. 3A.

Figure 4A:
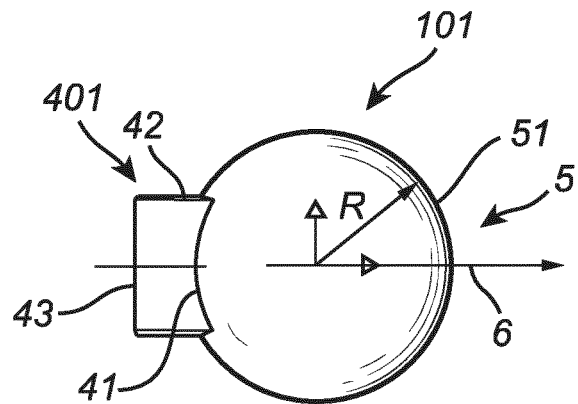
FIG. 4A shows a cross-sectional side view of a third embodiment of a light emitting device according to the invention.
Figure 4B:
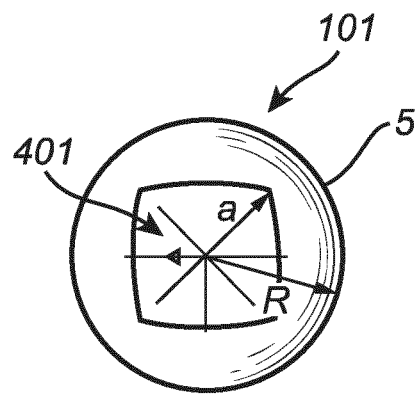
FIG. 4B shows a bottom view of the light emitting device according to FIG. 4A.
Figure 4C:
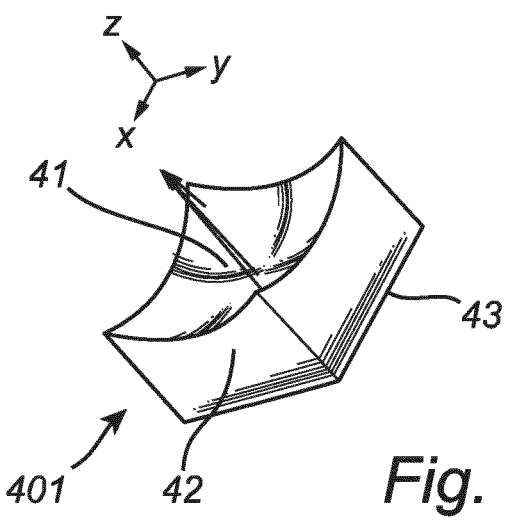
FIG. 4C shows a perspective view of a light mixing chamber of the light emitting device according to FIG. 4A.

FIG. 4A shows cross-sectional side view of a light emitting device 101 according to a third embodiment of the invention. FIG. 4B shows a bottom view of the light emitting device 101 according to FIG. 4A, and FIG. 4C shows a perspective view of a light mixing chamber 401 of the light emitting device 101 according to FIG. 4A. The light emitting device 101 differs from those of FIGS. 1-2C described above in that the light mixing chamber 401 of the light emitting device 101 is provided with a square cross-sectional shape with concave sides. The concave sides are provided since to obtain a perfect square illumination pattern, the shape of the light exit window 41 should be adapted in comparison with that shown in FIGS. 2A-C. The circumferential shape of the light exit window 41 of the light mixing chamber 401 could be defined by the following parametric equations:

$$x(t) = |\cos(t)|^{2/m} * a * \frac{\cos(t)}{|\cos(t)|} \quad \{2\}$$

$$y(t) = |\sin(t)|^{2/m} * a * \frac{\sin(t)}{|\sin(t)|} \quad \{3\}$$

Figure 5A:
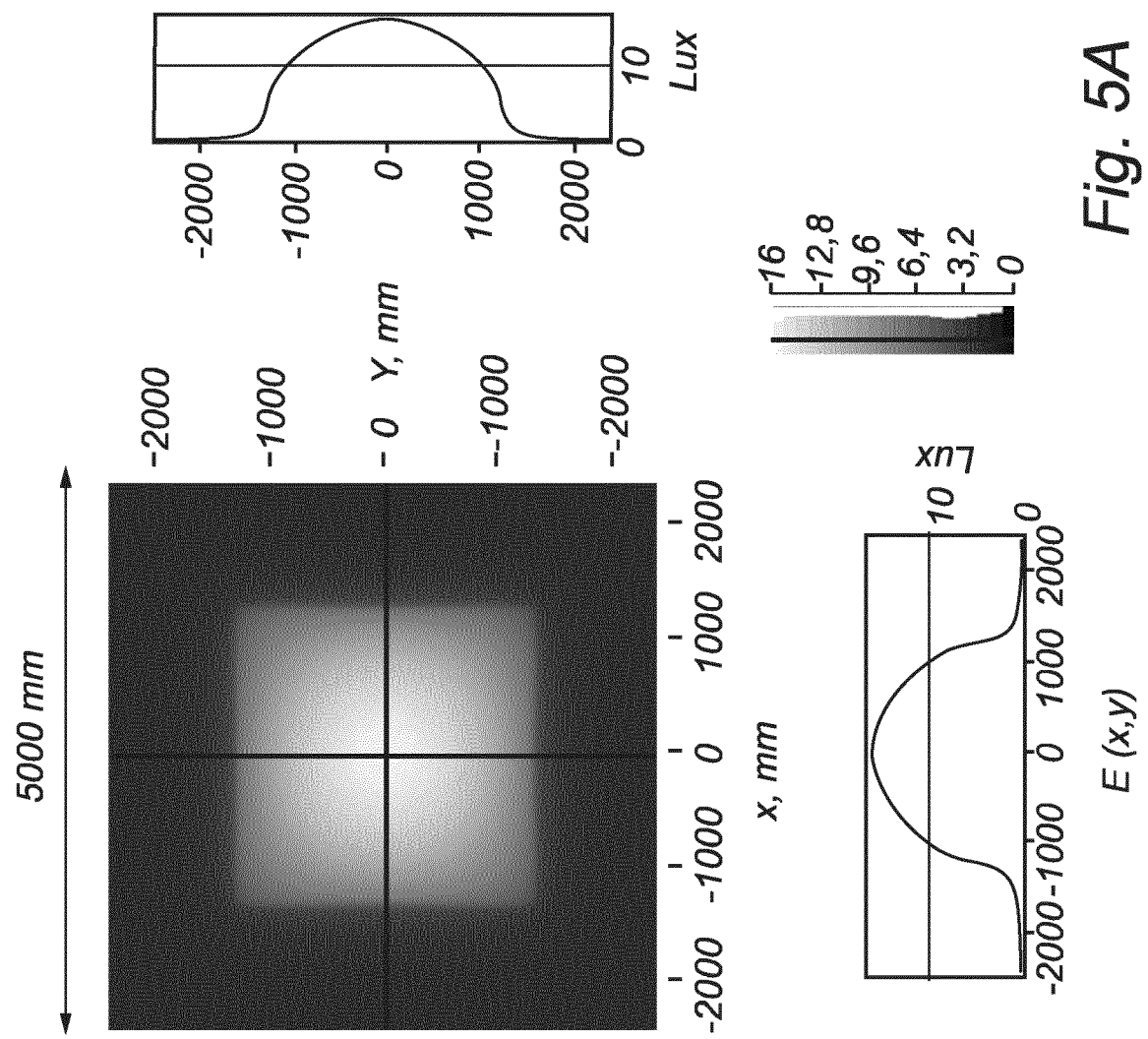
FIG. 5A illustrates a light pattern.
Figure 5B:
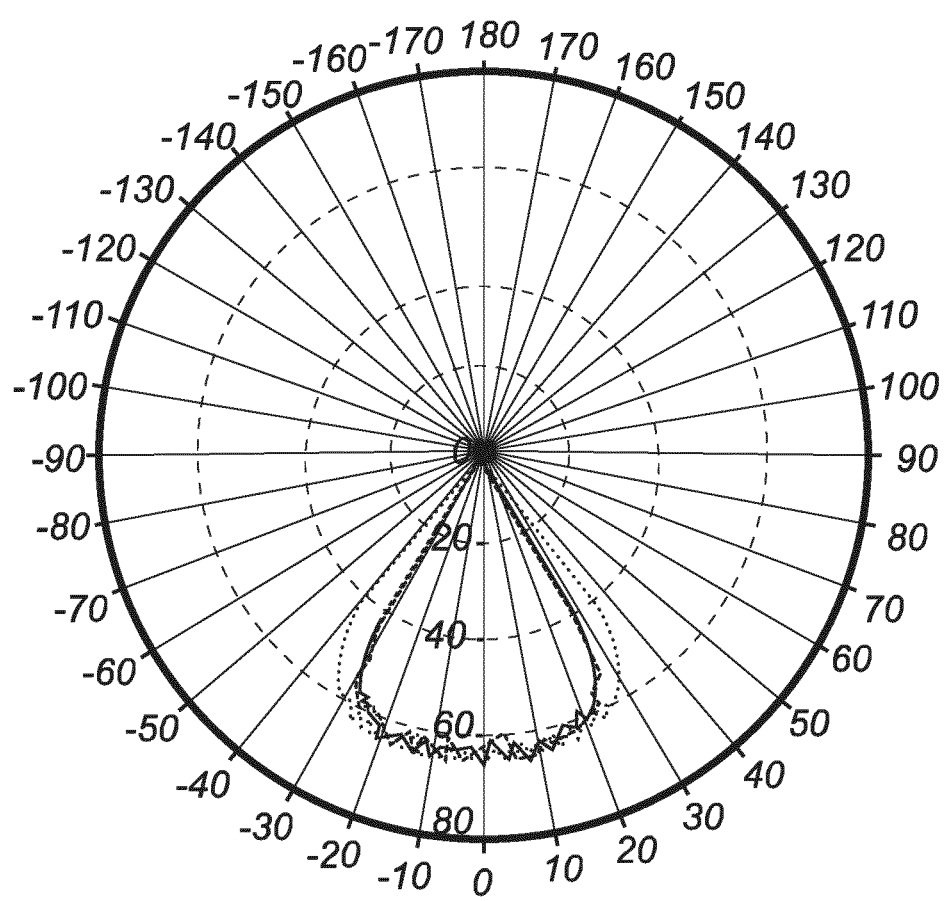
FIG. 5B illustrates an intensity distribution, obtained with a light emitting device according to FIG. 4A.

In equations 2 and 3, t is the parameter in the parametric representation (x(t), y(t)) describing the circumference of the mixing chamber, a is a scaling factor and m is a factor determining the shape. By way of example, in equations 2 and 3, a is equal to 10 millimeters and m is equal to 1.22. In the embodiment shown, R is equal to 15 millimeters, n is equal to 2.00, f is equal to 15 millimeters and d is equal to 15.1 millimeters. The resulting illuminance on the plane of projection (for instance a floor or a wall) is shown in FIG. 5A featuring a perfect square pattern, and the far-field intensity profile obtained with the light emitting device 401 is illustrated in FIG. 5B. In the examples illustrated in FIGS. 3 and 5, respectively, the distance between the light exit window 41 and the projection is 2000 millimeters.

In the embodiments above, a perfectly uniform extended source is assumed, i.e. the luminous emittance (lm/m²) of the extended light source is constant over the whole light emitting area. To tune illuminance of the projection (for example to produce a perfect uniform illuminated square), the luminous emittance of the extended light source may be adapted.

Another aspect is the quality or uniformity of the extended light source. This aspect may be taken into account by providing the light source 3 as a dense array of mini-LEDs or micro-LEDs. The size of a typical mini-LED is 100-200 micrometers. Micro-LEDs are much smaller, say 10-50 micrometers. These LEDs form an almost continuous luminous surface. In the projected image, the individual LEDs are barely visible. In this particular case, the micro LEDs form an almost continuous light emitting area. However, there are still small slits or gaps between the LEDs which may be visible when perfectly imaged. To avoid imaging of these slits or gaps, and thus to fine-tune the uniformity of the projected light pattern, the full collection of micro-LEDs can be placed slightly (say +/−0.2 millimeters) out of focus, i.e. placed a bit in front or behind the focal plane. To fine-tune the uniformity of the projected light pattern, the sources can be placed slightly out of focus (for example in front or behind the focal plane).

Figure 6A:
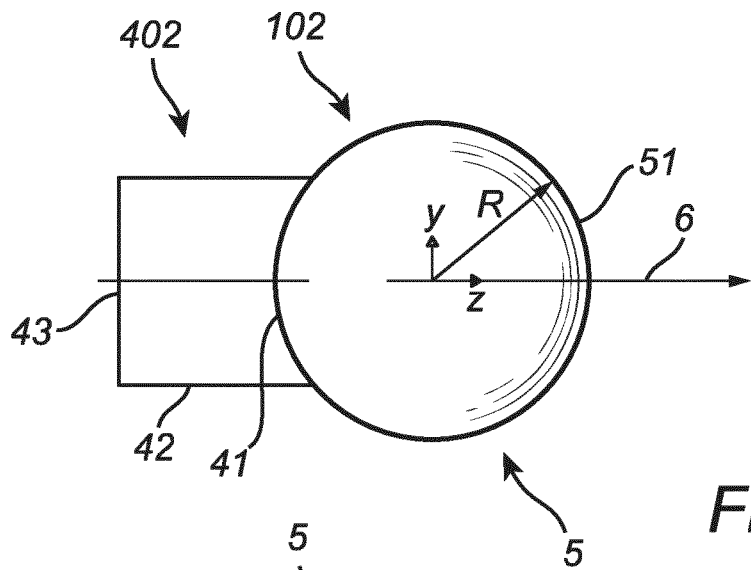
FIG. 6A shows a cross-sectional side view of a fourth embodiment of a light emitting device according to the invention and comprising two light sources adapted for emitting light with mutually different color temperatures.
Figure 6B:
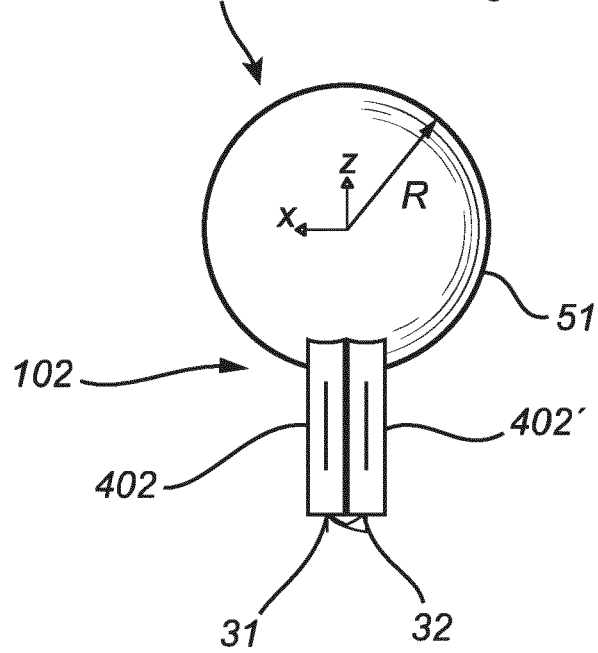
FIG. 6B shows a cross-sectional side view from another angle of view of the light emitting device according to FIG. 6A.
Figure 6C:
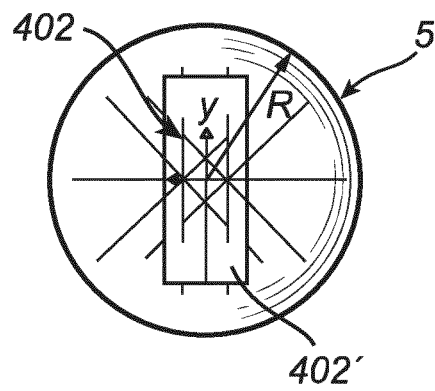
FIG. 6C shows a bottom view of the light emitting device according to FIG. 6A.

Turning now to FIG. 6A, a cross-sectional side view of a light emitting device 102 according to a fourth embodiment of the invention is shown. FIG. 6B shows a cross-sectional side view of the light emitting device 102 according to FIG. 6A seen from another angle of view, and FIG. 6C shows a bottom view of the light emitting device 102 according to FIG. 6A. The light emitting device 102 differs from those described above in that two light sources 31 and 32 and two light mixing chambers 402 and 402' are provided (cf. FIG. 6B). The two light sources 31, 32 are arranged on the mutually adjacently arranged rectangular light mixing chambers 402, 402'. The light exit windows 41 of the two light exit chambers 402, 402' comprise such a curvature as to conform to the curvature of the surface 51 of the optical component 5. In the example shown, this setup is combined with a spherical lens 5 with R being equal to 15 millimeters, n being equal to 1.80, f being equal to 16.9 millimeters and d being equal to 15.5 millimeters). The two adjacently arranged light sources 31 and 32, and thus also the two rectangular light exit windows 41 of the light mixing chambers 402, 402', emit light with different color temperatures, such as for instance 2200 K and 6500 K.

Figure 7A:
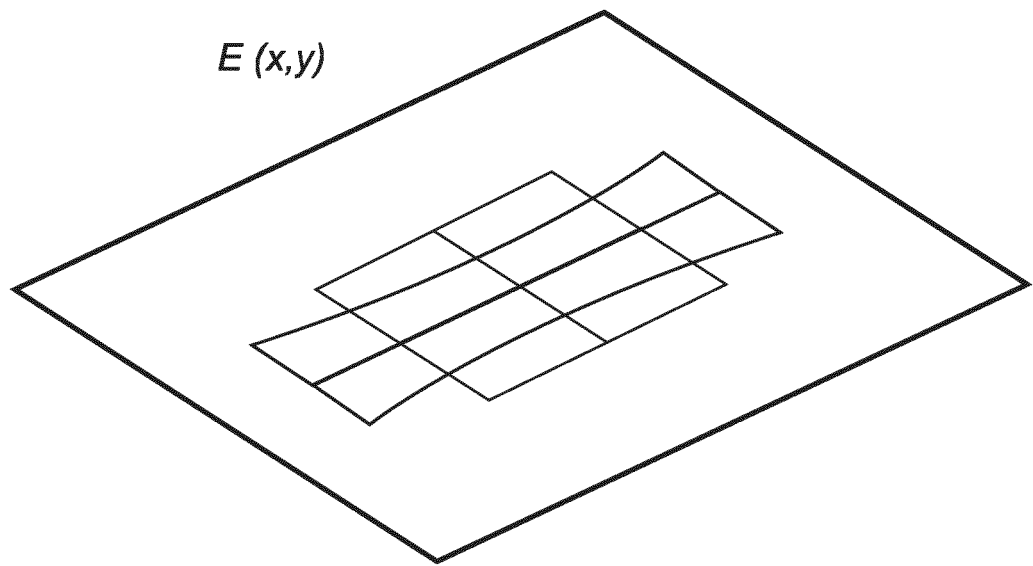
FIGS. 7A-C illustrate three different exemplary light patterns (top) and intensity distributions (bottom) obtainable with a light emitting device according to FIG. 6A.
Figure 7A:
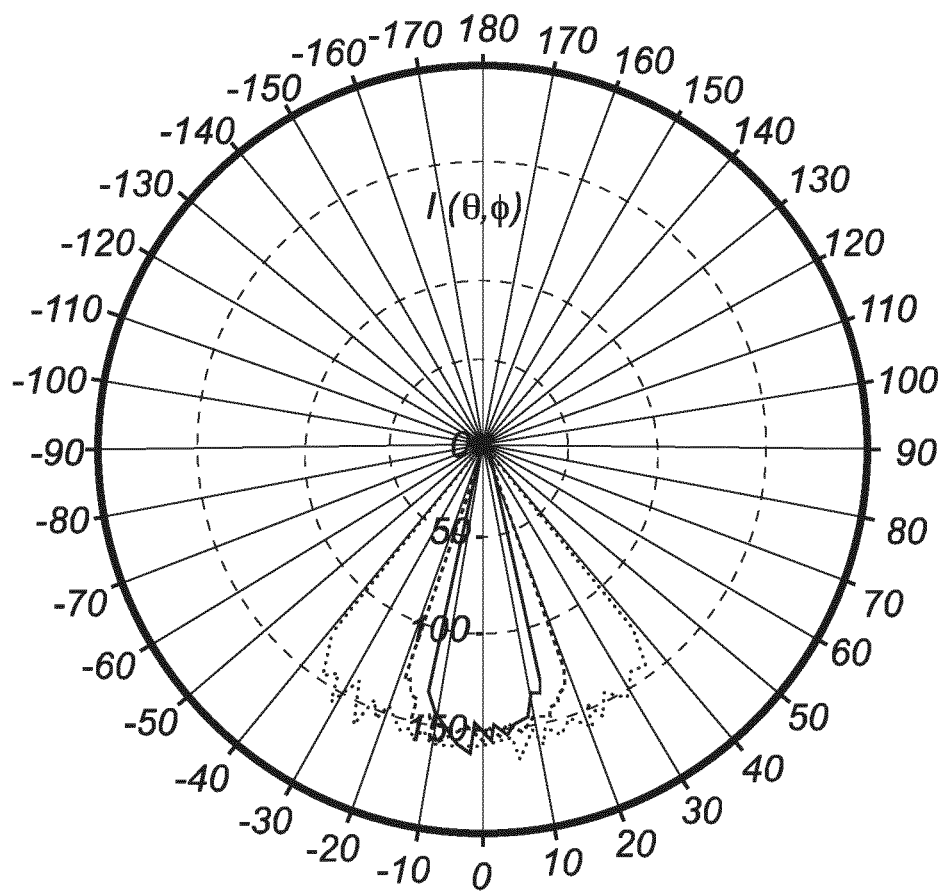
Figure 7B:
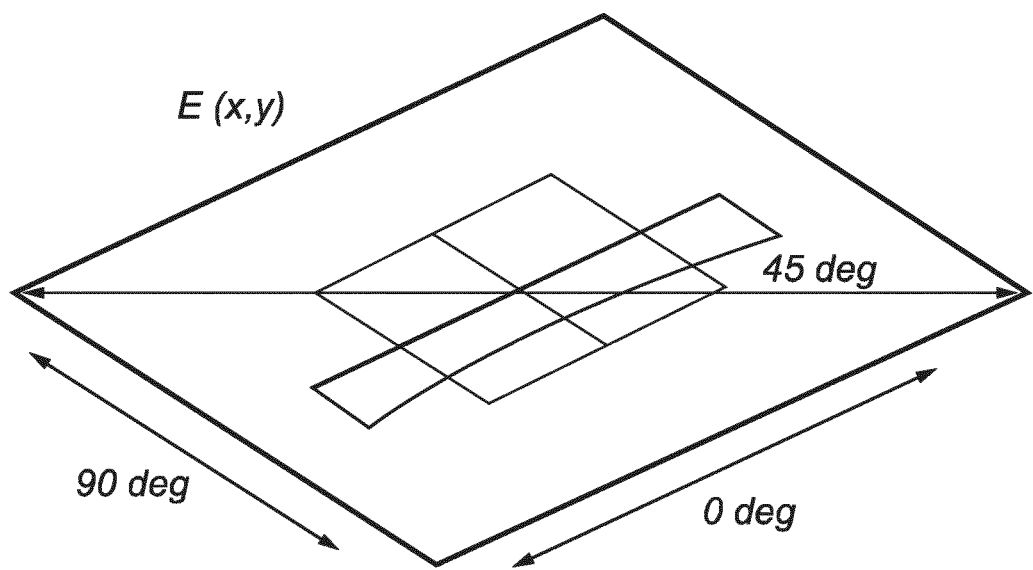
Figure 7B:
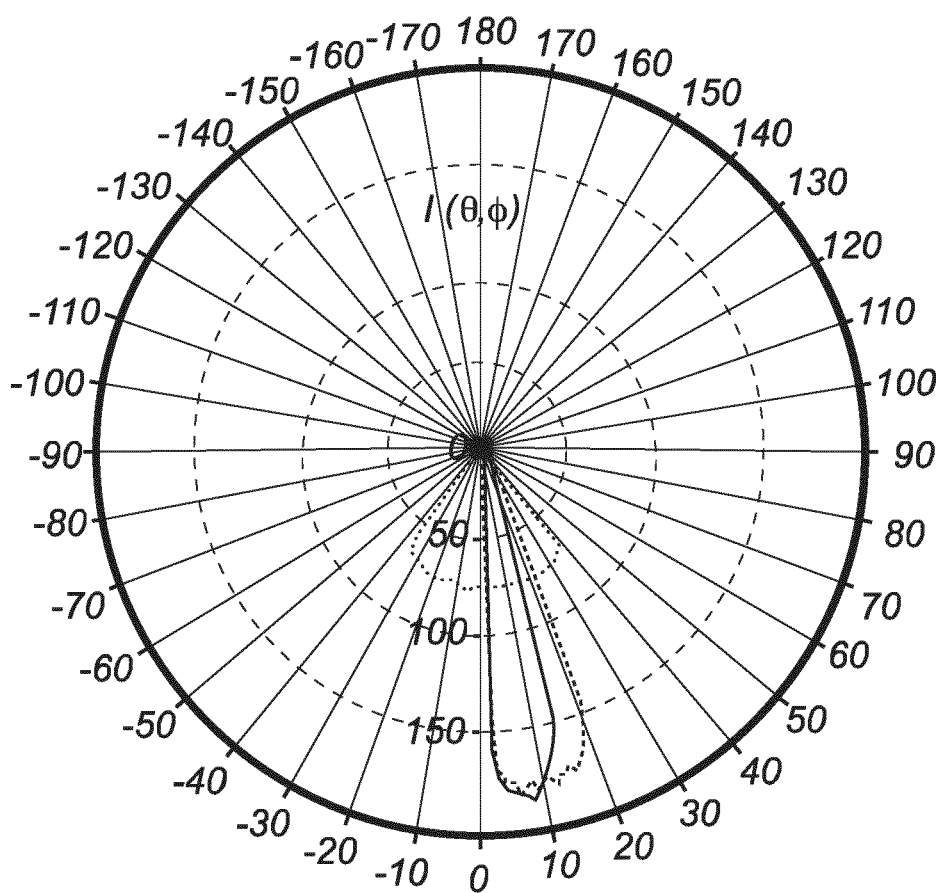
Figure 7C:
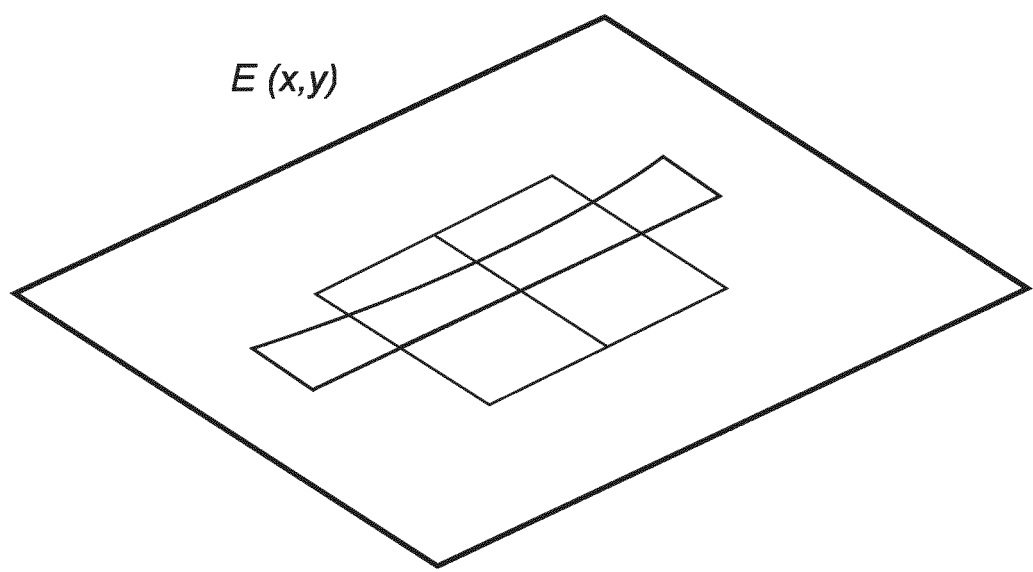
Figure 7C:
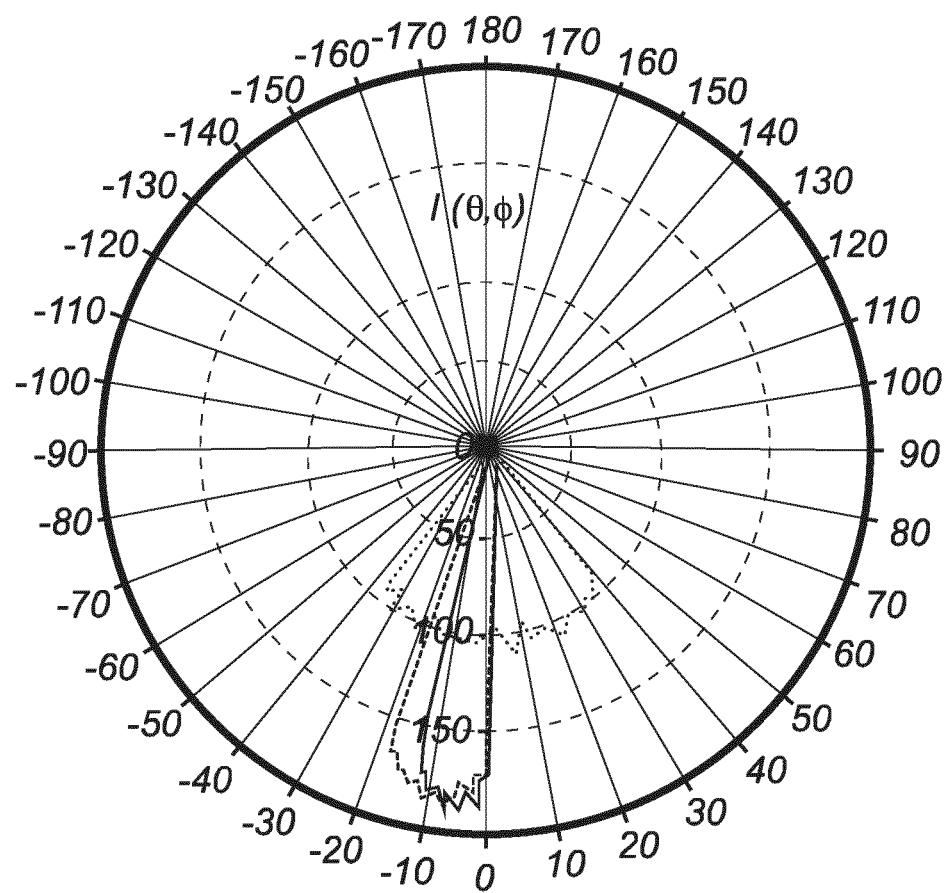

The two rectangular light exit windows 41 of the light mixing chambers 402, 402' create three possible illumination configurations as illustrated in FIG. 7A (both light sources 31, 32 on), FIG. 7B (only light source 32 on) and FIG. 7C (only light source 31 on). The distance from light emitting device to projection plane is 2000 millimeters. This embodiment allows much more complex and customizable illumination patterns.

Figure 8A:
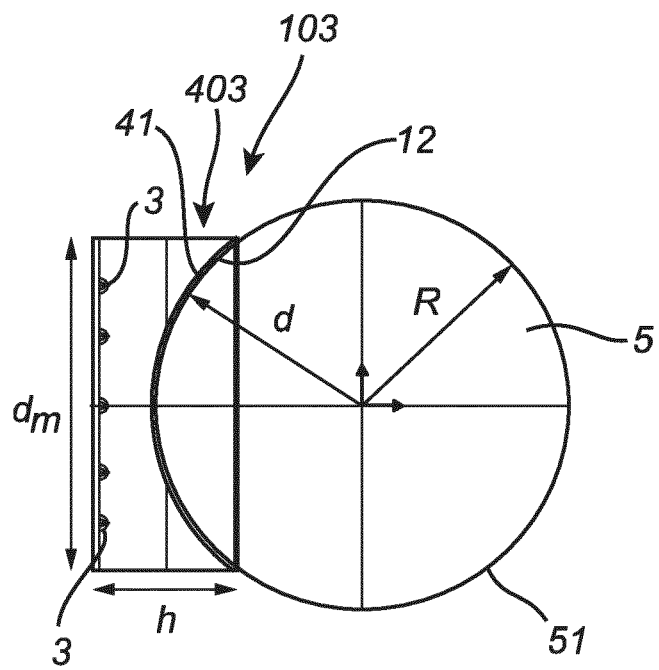
FIG. 8A shows a schematic cross-sectional side view of a fifth embodiment of a light emitting device according to the invention and comprising a light mixing chambers with two compartments.
Figure 8B:
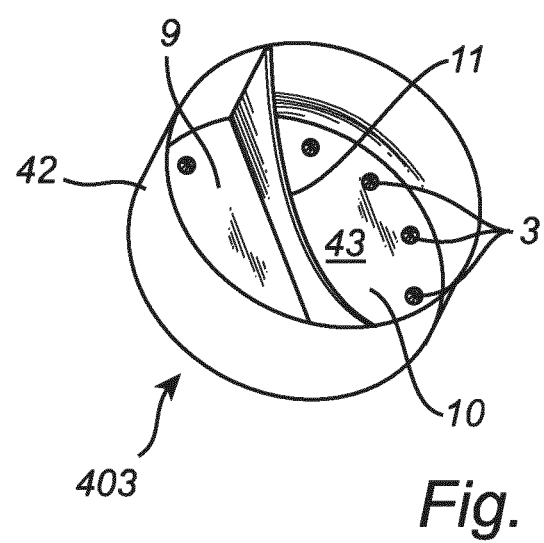
FIG. 8B shows a perspective view of the light emitting device according to FIG. 8A.

FIG. 8A shows cross-sectional side view of a light emitting device 103 according to a fifth embodiment of the invention. FIG. 8B shows a perspective view of the light mixing chamber 403 of the light emitting device 103 according to FIG. 8A. The light emitting device 103 differs from those described above in that the light mixing chamber 403 is provided with two compartments 9 and 10 separated by an optical separation sheet or wall 11. Embodiments with more than two such compartments are also feasible. More complex and flexible systems can thus be designed using a freeform mixing chamber consisting of a large number of compartments which can be individually controlled. The light sources 3 are placed on a flat surface 43 of the light mixing chamber 403. The light mixing chamber 403 may especially in this embodiment be a light mixing box. The light mixing chamber 403 furthermore comprises a highly reflective, and optionally also diffuse, wall 42. A diffuser 12 (FIG. 8A) is placed at the light exit window 41 of the light mixing chamber 403. The diffuser 12 is shaped to follow the shape of the focal surface of the spherical optical component 5. The advantage of such a light mixing chamber 403 is that the spherical optical component 5 receives uniform light without any artifacts from the individual light sources 3.

The luminous emittance (lm/m²) of the extended light source, i.e. the light exit window 41 of the light mixing chamber 403, can be tuned by changing the height, h, of the light mixing chamber 403 and/or the arrangement of the light sources 3 on the flat bottom surface 43. This in principle applies to all embodiments disclosed herein.

Also, the diffuser 12 can have different diffusive properties depending on the corresponding position on the light exit window 41 of the light mixing chamber 403. For instance, when a volume diffuser is used, the thickness of the diffuser 12 may vary over the light exit window 41. In the example of FIGS. 8A and 8B, the height, h, of the mixing chamber is 10 millimeters and the diameter, dm, is 24 millimeters. For the spherical optical component, R is equal to 15 millimeters, n is equal to 2.0 and d is equal to 15.1 millimeters. There are provided 10 light sources 3, each of 1 millimeter by 1 millimeter in size. These light sources 3 are placed on a circle with a radius of 10 millimeters on the bottom 43 of the light mixing chamber 403. The light sources 3 are LEDs with a Lambertian emission profile.

Figure 9A:
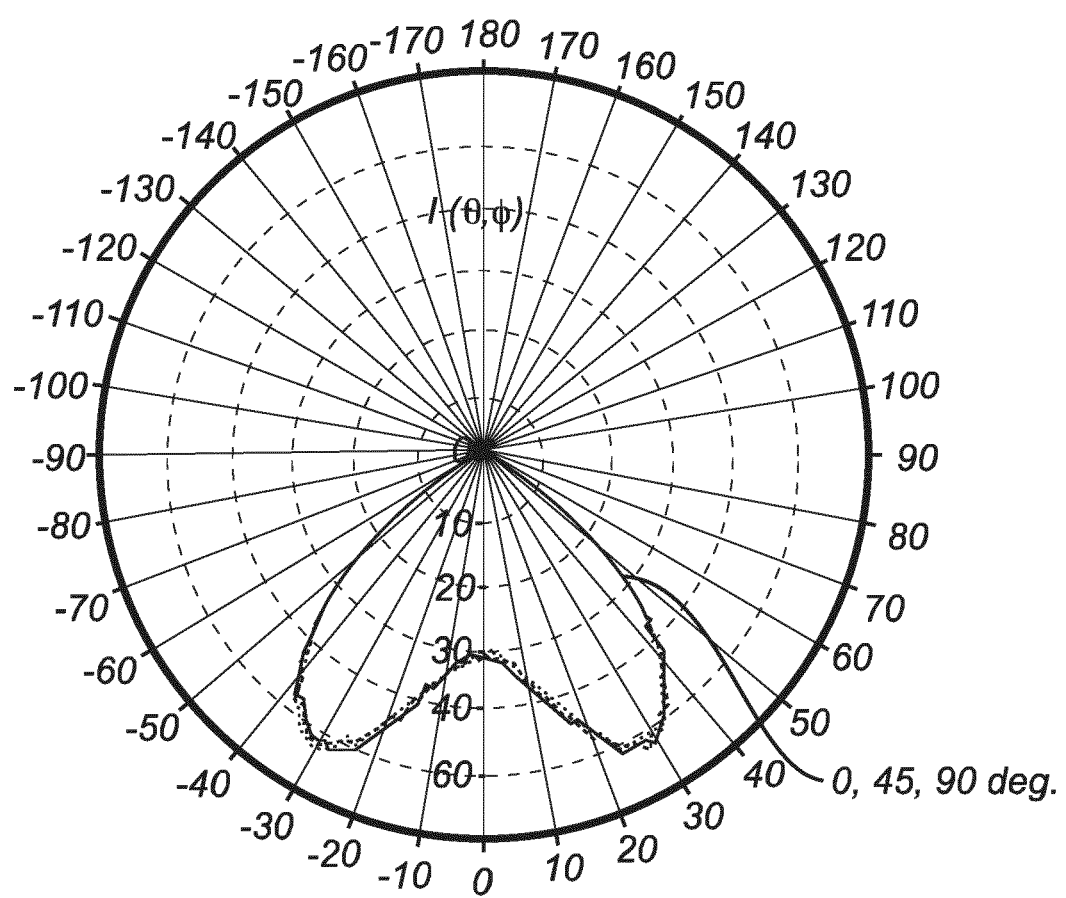
FIGS. 9A and 9B illustrate two different exemplary intensity distributions obtainable with a light emitting device according to FIG. 8A.
Figure 9B:
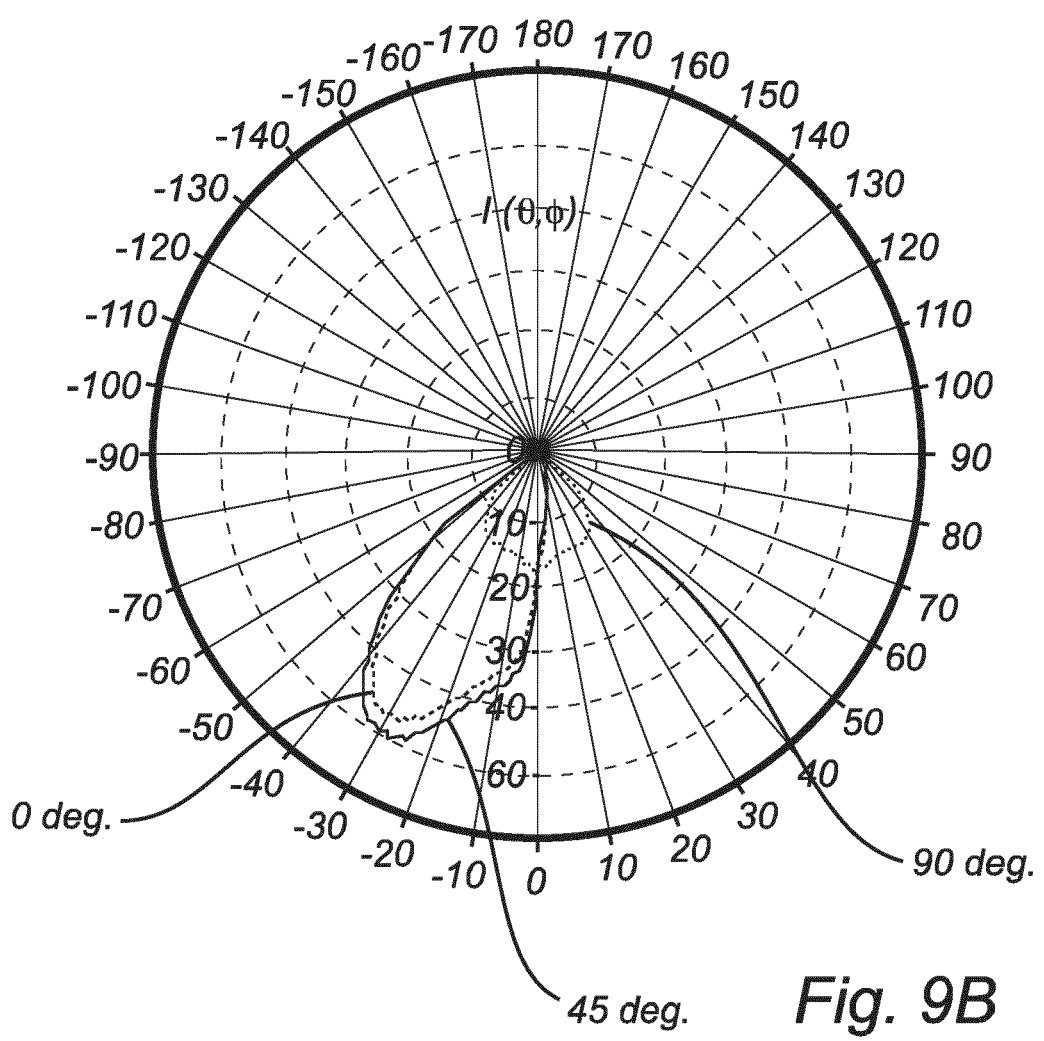

FIG. 9A illustrates the beam shape (far field intensity profile) obtained when the light sources in both compartments 9 and 10 of the light mixing chamber 403 of the light emitting device 103 of FIGS. 8A-B are on, and FIG. 9B when only the light sources in one compartment are on. The illuminance on the projection area is also indicated in FIGS. 9A and 9B. The projection area is 6000 millimeters by 6000 millimeters, and the distance to the projection area is 2000 millimeters.

It is noted that the separation between the compartments can be hard or soft. FIGS. 8A and 8B show a hard separation between the compartments. The transition can be made more soft or gradual by using a separation sheet or wall of a lower height, i.e. not touching the shaped diffuser over the whole length.

Figure 10:
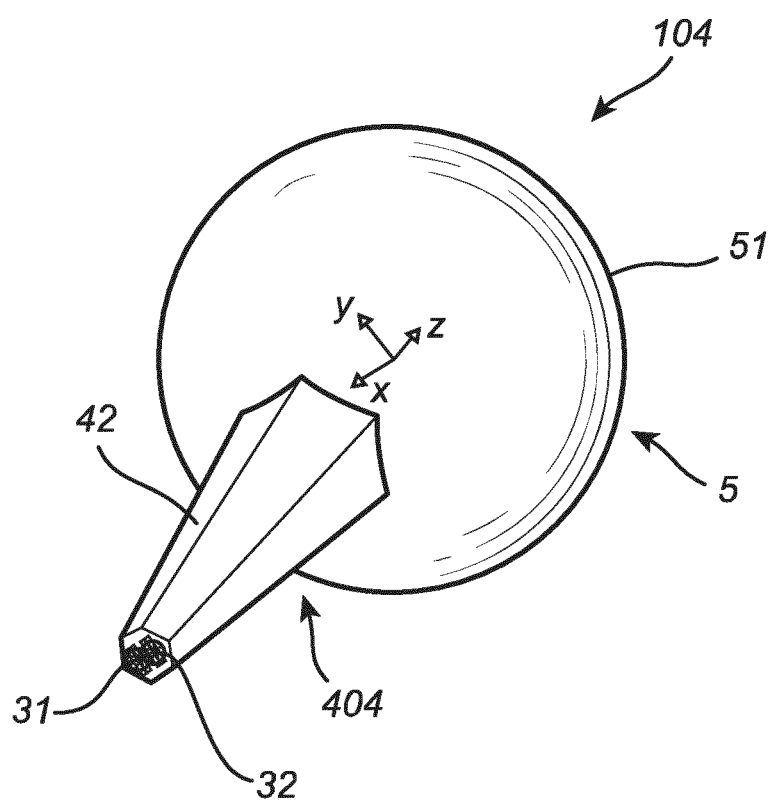
FIG. 10 shows a perspective view of a sixth embodiment of a light emitting device according to the invention.

FIG. 10 shows a perspective view of a light emitting device 104 according to a sixth embodiment of the invention. The light emitting device 104 differs from those described above in that the light mixing chamber is provided with a tapered configuration. More particularly, the light mixing chamber 404 is a tapered, hexagonal collimator used to mix and collimate the light from two LED light sources 31, 32 with a mutually different color temperature, for example 2200 K and 6500 K. The advantage of collimating the light (in addition to mixing the colors of the two different LED light sources) is that a higher optical efficiency and the formation of a more well-defined (sharp) image is obtained.

Figure 11A:
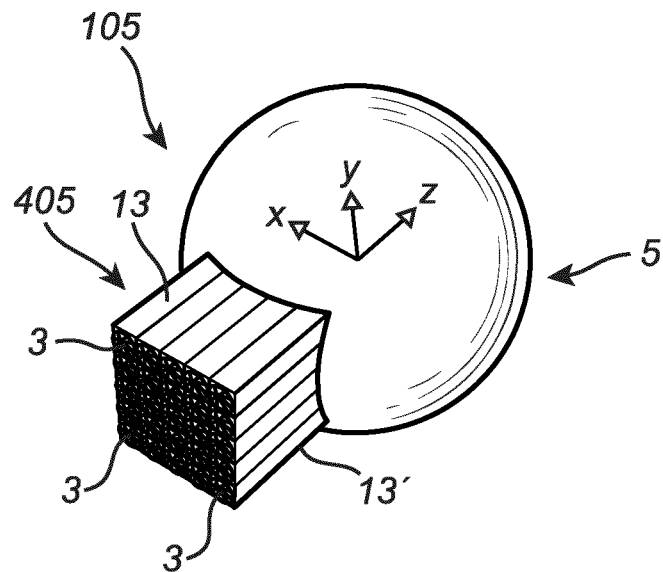
FIG. 11A shows a perspective view of a seventh embodiment of a light emitting device according to the invention.
Figure 11B:
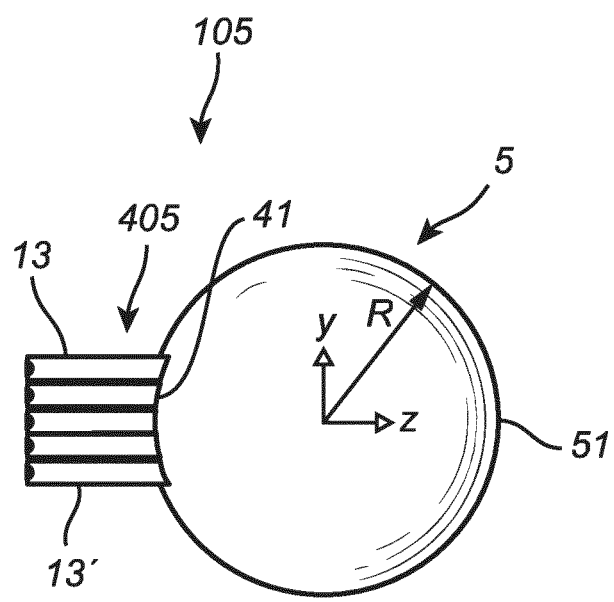
FIG. 11B shows a cross-sectional side view of the light emitting device according to FIG. 11A.
Figure 12A:
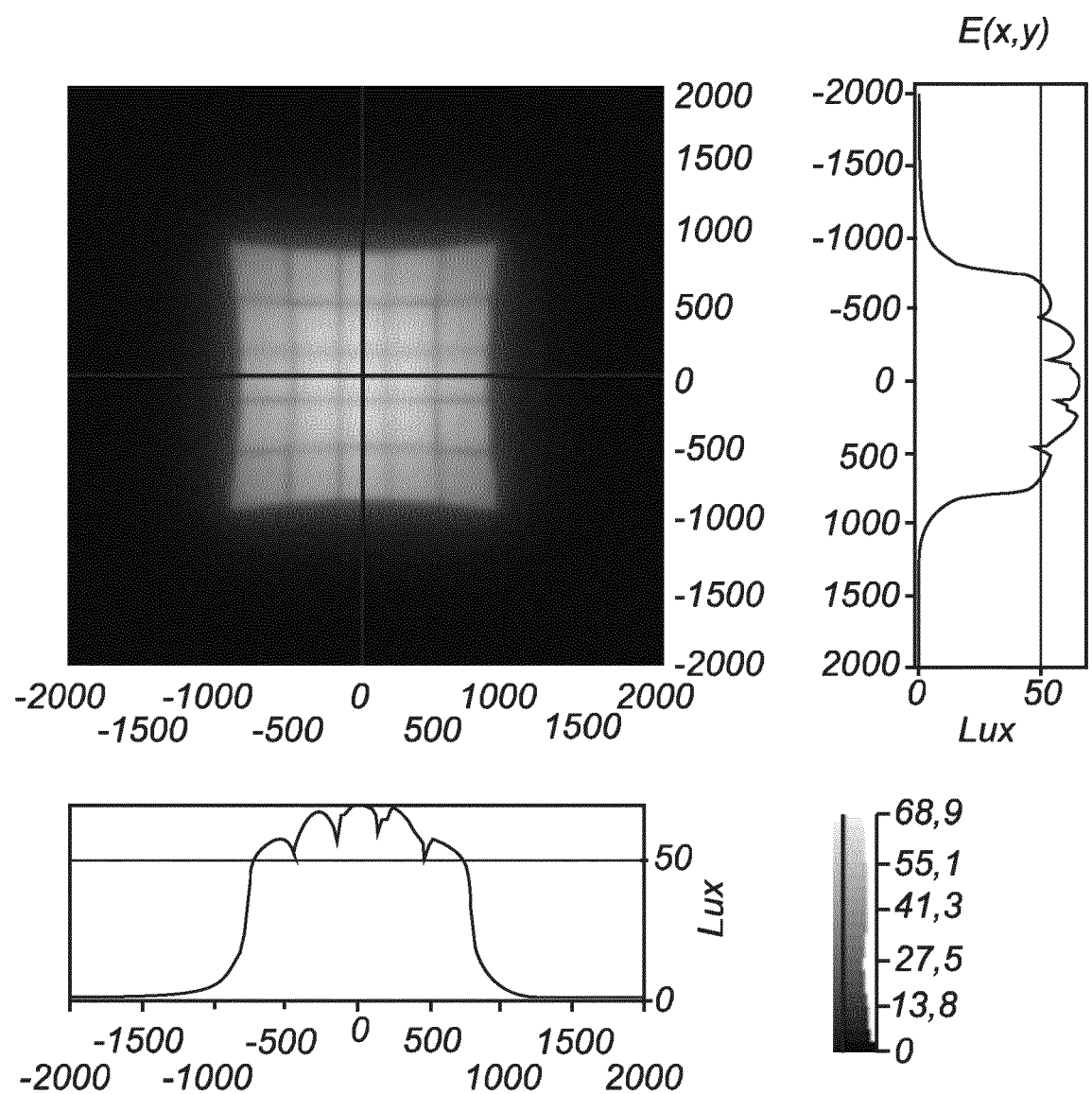
FIGS. 12A and 12B illustrate two different exemplary light patterns obtainable with a light emitting device according to FIG. 11A.
Figure 12B:
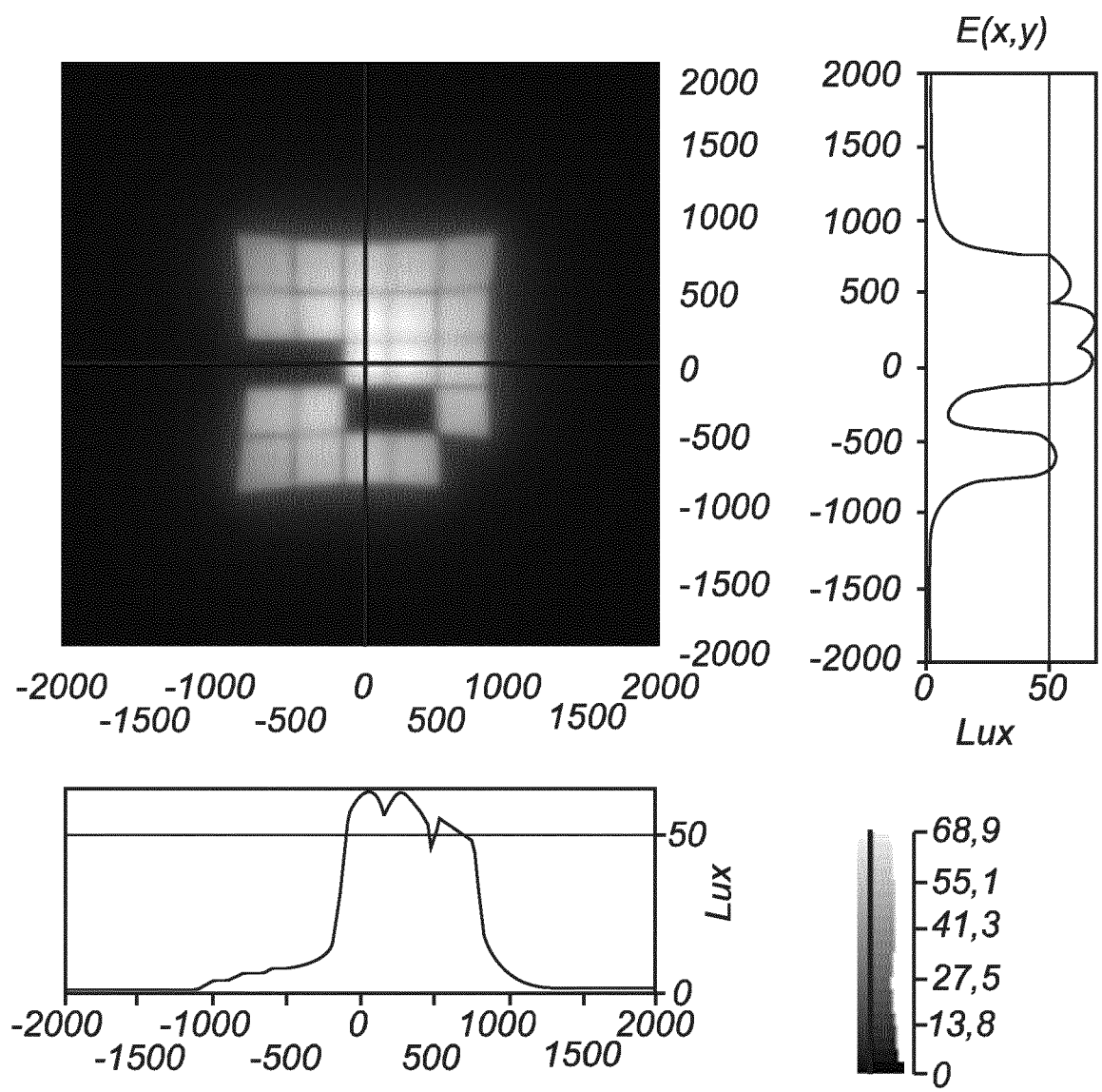

FIG. 11A shows a perspective view of a light emitting device 105 according to a seventh embodiment of the invention. FIG. 11B shows a cross-sectional side view of the light emitting device 105 according to FIG. 11A. The light emitting device 105 differs from those described above in that the light mixing chamber 405 comprises an array of mixing rods 13, 13' with square cross-sectional shape. In the example shown, an array of 5 by 5 or a total of 25 mixing rods 13, 13' are provided. Different array sizes are also feasible. The 25 thus formed light exit windows 41 are shaped such as to in combination conform to the shape of the focal surface of the spherical optical component 5. Each mixing rod 13, 13' is associated with one or more LED light sources 3. Each LED light source 3 or LED light source cluster is adapted to be individually controlled, i.e. turned on or off or even dimmed. By means of such a light emitting device 105, complex light patterns can be produced as is illustrated in FIGS. 12A and 12B. FIG. 12A shows the result of all light sources 3 being turned on, while FIG. 12B show the result of some light sources 3 being turned on and other turned off.

Figure 13:
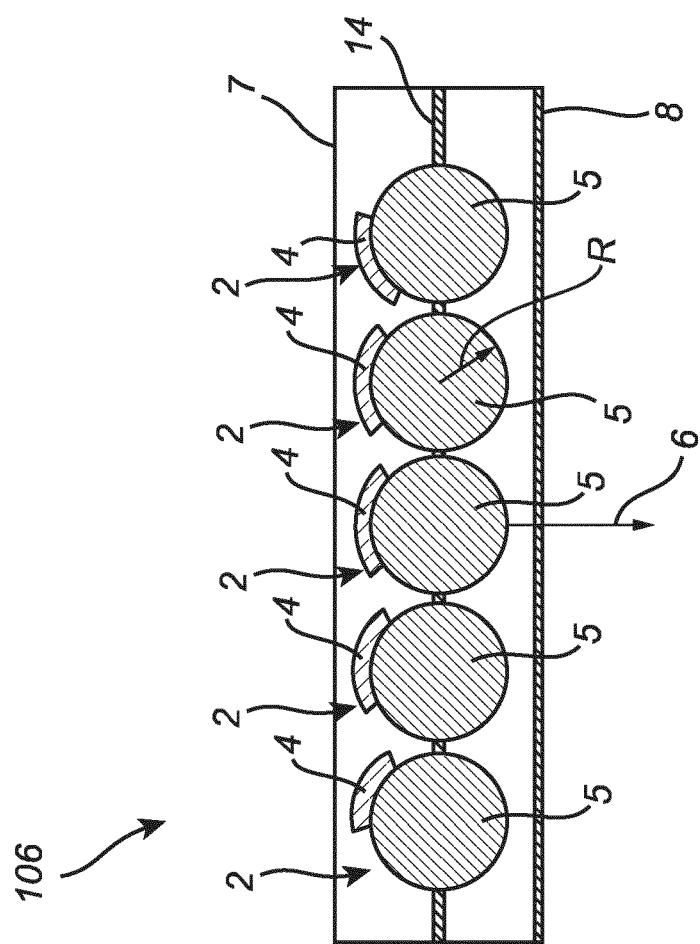
FIG. 13 shows a cross sectional side view of an eighth embodiment of a light emitting device according to the invention and comprising a plurality of light engines.

FIG. 13 shows cross-sectional side view of a light emitting device 106 according to an eighth embodiment of the invention. The light emitting device 106 differs from those described above, and in particular the one described in relation to FIG. 1, in that an array of spherical optical components 5 are provided, each associated with a light mixing chamber 4 and one or more light sources. The light sources are not shown on FIG. 13 for the sake of simplicity. In other words, the light emitting device 106 comprises a plurality of light engines 2, particularly as shown by way of a non-limiting example five light engines 2.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device adapted for projecting a light beam onto a target surface, the light emitting device comprising:
a light engine comprising a light source,
a light mixing chamber comprising a light exit window,
an optical component having a spherical shape with a curved light-receiving surface, and
a diffuser,
wherein the light source is arranged to, in operation, emit light towards the light exit window of the light mixing chamber,
wherein the diffuser is provided at the light exit window of the light mixing chamber,
wherein the optical component is provided adjacent to the diffuser, and
wherein the shape of the diffuser is conformal to the curved light-receiving surface of the optical component and the diffuser is placed distance from the optical component coincident with a predetermined focal plane of the optical component; wherein the spherical shape is a sphere, and the predetermined focal plane is equal to:

$$f=(R \cdot n)/(2(n-1))$$

where f is a focal length, R is a radius of the sphere, and n is a refractive index of the spherical shape.

2. A light emitting device according to claim 1, wherein the optical component is a spherical lens, a ball lens or a dielectric sphere.

3. A light emitting device according to claim 1, wherein the light source comprises any one of at least one LED, an array of LEDs, an array of mini-LEDs and an array of micro-LEDs.

4. A light emitting device according to claim 3, wherein each LED of the array of LEDs, mini-LEDs and/or micro-LEDs is individually controllable.

5. A light emitting device according to claim 1, and comprising two or more light engines.

6. A light emitting device according to claim 1, wherein the light exit window of the light mixing chamber is rectangular.

7. A light emitting device according to claim 1, wherein the light mixing chamber comprises reflective walls.

8. A light emitting device according to claim 1, wherein the light mixing chamber is divided into at least two compartments.

9. A light emitting device according to claim 8, wherein the at least two compartments of the light mixing chamber are separated by means of a diffusive or specular reflective wall.

10. A light emitting device according to claim 1, wherein the light mixing chamber comprises any one of mixing rods, tapered mixing rods, light guides, tapered light guides, a tapered hexagonal collimator and an array of square mixing rods.

11. A light emitting device according to claim 1, wherein the optical component is or comprises an array of lenses.

12. A light emitting device according to claim 11, wherein each lens of the array of lenses is associated with a light source.

13. A lamp, a luminaire or a lighting fixture comprising a light emitting device according to claim 1.

14. A light emitting device according to claim 1, wherein the light engine includes a plurality of light sources and wherein light exiting the diffuser and received by the optical component is uniform light without artifacts from an individual light source from the plurality of light sources.

* * * * *